US007431787B2

(12) United States Patent
Bosio et al.

(10) Patent No.: US 7,431,787 B2
(45) Date of Patent: Oct. 7, 2008

(54) METHOD, SHAPING DRUM, AND PLANT FOR MANUFACTURING A TIRE FOR A VEHICLE WHEEL

(75) Inventors: Gian Luigi Bosio, Bagnolo Cremasco (IT); Roberto Rungo, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 382 days.

(21) Appl. No.: 10/485,029

(22) PCT Filed: Jul. 23, 2002

(86) PCT No.: PCT/EP02/08186

§ 371 (c)(1),
(2), (4) Date: Sep. 7, 2004

(87) PCT Pub. No.: WO03/013835

PCT Pub. Date: Feb. 20, 2003

(65) Prior Publication Data
US 2005/0016662 A1 Jan. 27, 2005

Related U.S. Application Data

(60) Provisional application No. 60/324,274, filed on Sep. 25, 2001.

(30) Foreign Application Priority Data
Jul. 30, 2001 (EP) ................... 01830509

(51) Int. Cl.
*B29D 30/24* (2006.01)
*B29D 30/36* (2006.01)

(52) U.S. Cl. ............ 156/130.7; 156/132; 156/133; 156/135; 156/396; 156/398; 156/415

(58) Field of Classification Search ........... 156/111, 156/126, 135, 132, 396, 398, 400–402, 406.2, 156/406.4, 415
See application file for complete search history.

(56) References Cited
U.S. PATENT DOCUMENTS
3,492,184 A * 1/1970 Brey et al. ............ 156/414
(Continued)

FOREIGN PATENT DOCUMENTS
DE 118 248 2/1976
(Continued)

Primary Examiner—Geoffrey L Knable
(74) Attorney, Agent, or Firm—Finnegan, Henderson, Farabow, Garrett & Dunner, L.L.P.

(57) ABSTRACT

A method for building a tyre for a vehicle wheel includes positioning a casing sleeve on a shaping drum and securing the sleeve on the drum. During at least one of positioning and securing the sleeve, the sleeve is kept in an essentially centered position on the drum by radial forces directed against a radially inner surface of the sleeve. A shaping drum for making a tyre for a vehicle wheel includes a rotation shaft and two coaxial half-drums integral with each other with respect to rotation. At least one of the half-drums is axially movable in both directions with respect to the other half-drum. Each half-drum includes a support device, a gripping device, and a centering device. A first equatorial plane defined the centering devices is axially movable with respect to a second equatorial plane defined by the gripping devices. A plant for building a tyre is also disclosed.

16 Claims, 13 Drawing Sheets

U.S. PATENT DOCUMENTS

| | | | | |
|---|---|---|---|---|
| 3,674,604 A | * | 7/1972 | Gazuit | 156/415 |
| 3,887,423 A | * | 6/1975 | Gazuit | 156/402 |
| 3,923,572 A | * | 12/1975 | Garver | 156/130 |
| 3,990,931 A | | 11/1976 | Leblond et al. | |
| 4,243,451 A | | 1/1981 | Kortman | |
| 4,468,267 A | * | 8/1984 | Irie | 156/132 |
| 4,470,867 A | | 9/1984 | Caretta et al. | |
| 4,798,276 A | | 1/1989 | Loeffler | |
| 4,812,196 A | * | 3/1989 | Ishii | 156/412 |
| 5,267,595 A | * | 12/1993 | Lampe | 152/525 |
| 5,582,666 A | | 12/1996 | Irie | |
| 5,634,993 A | | 6/1997 | Drieux et al. | |
| 6,139,668 A | * | 10/2000 | Stokes et al. | 156/111 |
| 6,475,319 B1 | * | 11/2002 | Akiyama | 156/111 |
| 6,783,618 B2 | * | 8/2004 | Lacagnina et al. | 156/111 |

FOREIGN PATENT DOCUMENTS

| | | |
|---|---|---|
| EP | 0 676 277 | 11/1995 |
| EP | 0 997 263 A2 | 5/2000 |
| EP | 1 216 814 A1 | 6/2002 |
| FR | 2093180 | 1/1972 |
| NL | 8200053 | 8/1983 |

* cited by examiner

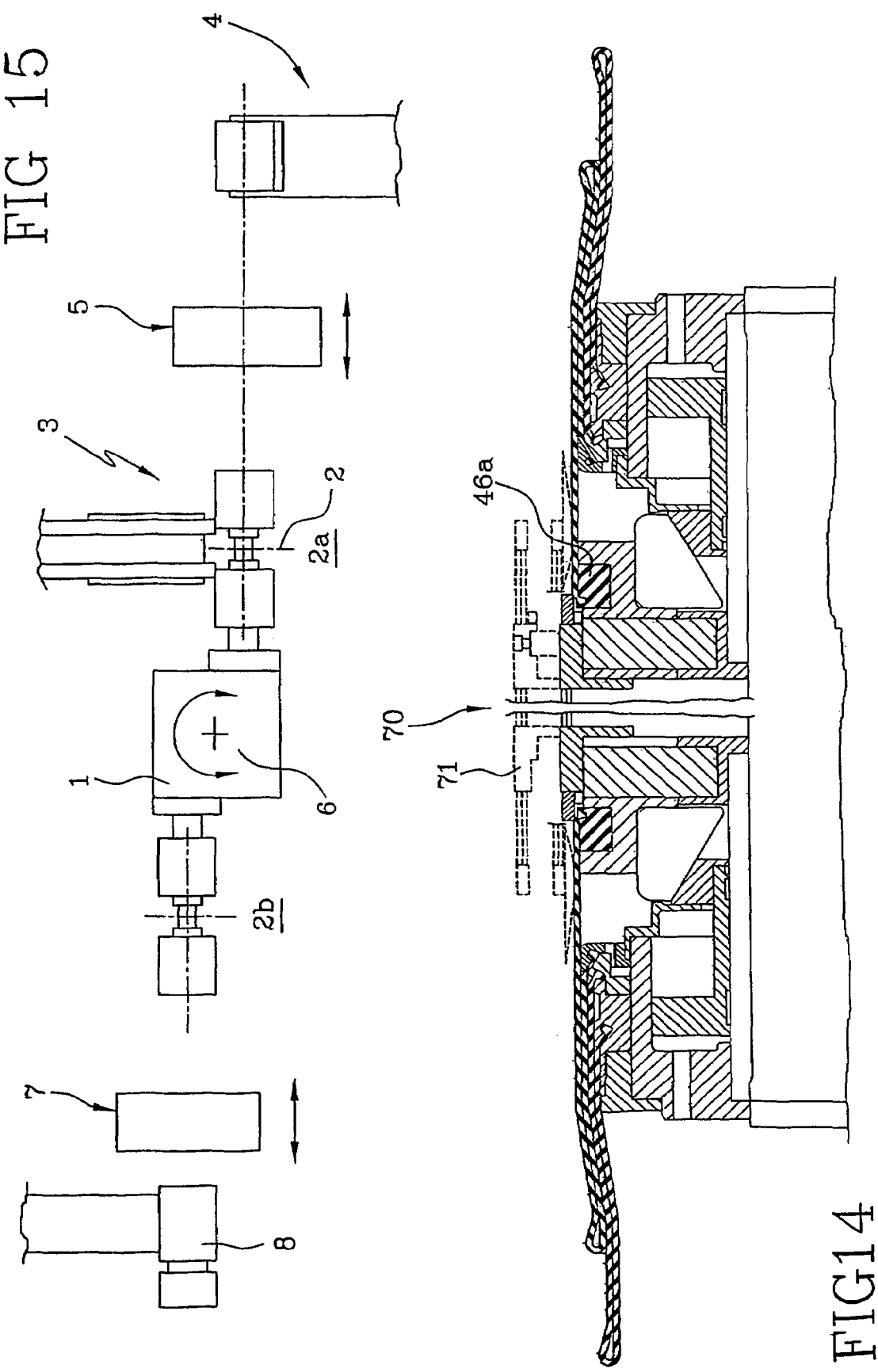

METHOD, SHAPING DRUM, AND PLANT FOR MANUFACTURING A TIRE FOR A VEHICLE WHEEL

CROSS REFERENCE TO RELATED APPLICATIONS

This application is a National Phase Application based on PCT/EP02/08186, filed on Jul. 23, 2002, the content of which is incorporated herein by reference, and claims the priority of European Patent Application No. 01830509.4, filed on Jul. 30, 2001, and the benefit of U.S. Provisional Application No. 60/324,274, filed on Sep. 25, 2001.

BACKGROUND OF THE INVENTION

1. Field of the Invention

The present invention relates to a method for manufacturing a tyre for vehicle wheels, comprising the following steps: forming a casing sleeve provided with a pair of annular bead reinforcing structures spaced apart from each other axially and at least one casing ply having each of its opposite end flaps turned around one of the said annular bead reinforcing structures; transferring the casing sleeve to a shaping drum; shaping the said casing sleeve into a toroidal configuration; and applying a pair of sidewalls on to lateral surfaces of the casing sleeve shaped in this way, each of these surfaces extending radially outwards from one of the annular bead reinforcing structures. According to the aforesaid method, the manufacture of a tyre for vehicle wheels also comprises the steps of forming an outer sleeve comprising a belt structure and a tread applied in a radially external position on to the belt structure, and transferring the said outer sleeve into a centred position around the casing sleeve positioned on the shaping drum, to cause the outer sleeve to be applied to the casing sleeve as a result of this shaping. The operations associated with building the outer sleeve can be carried out in any known way and are not of any special significance for the purposes of the present invention, and are therefore not described in detail below.

The invention also relates to a building drum, and more precisely a shaping drum, for manufacturing a tyre for vehicle wheels, provided with two coaxial half-drums, integral with each other as regards rotation, which make up the drum, at least one of these half-drums being axially movable in both directions with respect to the other. Each of the said half-drums comprises a suitable expandable portion which causes one sidewall to be turned so that it is applied to the corresponding lateral surface of the casing structure; the said drum is also provided with radially expandable gripping devices for retaining the beads of the casing sleeve on the shaping drum, and with centring devices for the centred axial positioning of the casing sleeve on the equatorial plane of the shaping drum.

2. Description of the Related Art

A tyre building method widely used in the art is that commonly known as the "two-step process". More particularly, in the tyre making process one or more casing plies are first deposited on a first cylindrical drum, usually called the "building drum" or "first step drum", to form a cylindrical sleeve. The annular reinforcing structures at the beads are fitted on to the opposite end flaps of the casing ply or plies, which are then turned around the annular structures in such a way as to enclose them in a kind of loop.

The casing sleeve built in this way is then transferred to a second drum, called the "shaping drum" or "second step drum", on which strips of elastomeric material for forming the sidewalls of the tyre may already have been positioned.

The casing is then shaped into a toroidal configuration to join it to an outer crown sleeve which has previously been placed in a centred position with respect to the casing sleeve, and which comprises a belt structure and a tread radially superimposed on the belt structure.

After the casing structure has been shaped, suitable expandable portions of the shaping drum, consisting for example of lever mechanisms or inflatable chambers, cause the said strips of elastomeric material to be turned so that they are applied to the lateral surfaces of the casing structure.

Methods and apparatus operating according to these principles are described, for example, in FR-A-2,093,180 and U.S. Pat. No. 3,990,931.

The critical aspect of this method consists in the fact that all the operations carried out in the second step are executed on a casing sleeve which may not have been perfectly centred in its fitting on the shaping drum; in other words, its equatorial plane may not coincide with the equatorial plane of the said drum, so that it is secured on the latter only by the securing force exerted by suitable radially expandable gripping devices on the corresponding reinforcing portions of the casing sleeve, which will be referred to simply as "beads", as is the usual practice, in the following text.

This retaining force may not be sufficient to prevent small displacements of the beads with respect to the corresponding gripping devices, or the unwinding of the casing ply from around the annular bead reinforcing structures, particularly during the step of toroidal shaping of the beads, so that, as a result of the incorrect fitting and/or subsequent displacement of the sleeve on the drum or unwinding of the ply at the beads, a deformed shaping of the casing is possible, and consequently the completion of a tyre which has uneven geometry and must therefore be discarded, since it will be unbalanced in use.

The document EP-997,263, in the context of a two-step process, illustrates a method and an apparatus for building tyres, according to which the axial centring of the casing sleeve is ensured during its fixing to the shaping drum at the end of the step of transferring the sleeve to the drum.

However, the problem has not been fully resolved, and has become even more critical with the development of a new kind of tyre, fully described for example in U.S. Pat. No. 5,634,993. This tyre is characterized in that it has its beads, preferably with different fitting diameters and different dimensions from each other, joined to a rim having the bead support surfaces, in other words the bead bases, facing axially outwards, in other words inclined in the form of a conical surface with its vertex on the axis of rotation of the rim in a position axially external to the tyre.

This particular bead geometry increases the risks of an incorrect centring of the casing sleeve on the shaping drum.

The problem is further complicated by the fact that this tyre requires the presence of a reinforcing element on the axially inner surface of the bead, to protect the latter from friction against the metal surface of the mounting rim.

This reinforcing element is preferably assembled on to the tyre in the second building step, but the particular position in which it has to be fixed prevents the use of centring devices acting against the axially inner surface of the bead, such as those described in the document EP-997,263 cited above.

SUMMARY OF THE INVENTION

The applicant has now found that considerable advantages can be achieved, particularly in terms of reliability of the manufacturing processes and of the apparatus used, and in terms of the quality of the finished product, if the casing sleeve is mounted in a position in which it is axially and radially centred on the said drum, by means of devices which enforce this centred position by bearing on inner surfaces of the said sleeve, thus physically preventing any displacement of the sleeve from the predetermined position.

According to the present invention, the applicant has devised a tyre building method, and also produced the corresponding shaping drum, with which it is possible not only to build a tyre while ensuring the stability of the axial and radial centring of the casing sleeve on the drum during all the second-step operations, but also to assemble a reinforcing element on to the axially inner surface of the bead in conjunction with the said enforced centring.

The object of the present invention is therefore a tyre building method, and the corresponding apparatus, which essentially carries out all the steps of work on a casing sleeve which is kept axially and radially centred on a shaping drum.

According to another object of the present invention, the said method and apparatus also permit the operation of assembling a reinforcing bead element on to the axially inner surface of the said bead.

In a first aspect, the invention relates to a method for building a tyre for vehicle wheels, comprising the steps of:

A) positioning a casing sleeve on a shaping drum; B) securing the said casing sleeve on the said shaping drum; C) toroidally shaping the said casing sleeve; D) applying a pair of sidewalls on to lateral surfaces of the said shaped casing sleeve; and E) applying an outer sleeve on to the radially outer surface of the said casing sleeve, in which, during the execution of at least one of the steps C, D and E, the said casing sleeve is kept in an essentially centred position on the said shaping drum by axial forces directed against axially inner surfaces of the said sleeve.

During the execution of at least one of the said steps A and B, in which the casing sleeve is, respectively, positioned and secured on the said shaping drum, the said casing sleeve is preferably kept in an essentially centred position on the said shaping drum by means of radial forces directed against the radially inner surface of the said sleeve.

Preferably, the aforesaid method comprises a step F) of positioning the said sidewalls on the said shaping drum, where the said sidewalls are positioned with their axially inner edges in axially inner positions with respect to the beads of the said casing sleeve.

Advantageously, the method in question comprises a further step G of turning the said axially inner edges on to the axially inner surfaces of the said beads, the said step G taking place before or after the said step C of toroidal shaping of the said casing sleeve.

Preferably, the said step G of turning the said axially inner edges on to the axially inner surfaces of the said beads is carried out by the inflation of at least one inflatable chamber.

Alternatively, it is carried out by means of turning devices made to act against a radially inner surface of the said axially inner edge.

Advantageously, the said step F takes place before or after the said step A) of positioning the said sleeve on the said drum.

Preferably, in the method according to the invention, the said step of positioning the said sidewalls on the said shaping drum also comprises the step of securing one end of a sidewall strip on the surface of the said shaping drum before the said strip is wound around the said drum.

In a further aspect, the invention relates to a shaping drum for making a tyre for vehicle wheels, starting with a casing sleeve provided with axially opposed beads, the said drum comprising a rotation shaft connected for operation to two coaxial half-drums, integral with each other with respect to rotation, at least one of which is axially movable in both directions with respect to the other, each of the said half-drums comprising a support device for the positioning of a sidewall on the said casing sleeve and its application thereto, a gripping device for securing one of the said beads on the said drum, and a centring device for the centred positioning of one of the said beads on the said drum, where the equatorial plane defined by the centring devices mounted on the said half-drums is axially movable with respect to the equatorial plane defined by the gripping devices mounted on the said half-drums.

Preferably, the said gripping device also has a first and a second guide which delimit a fixed path for a moving element, while the said centring devices have a mechanism which, when operated, forces the said moving element to move along the said fixed path, enabling the axial centring position of the said casing sleeve to be varied with respect to the equatorial plane of the said drum.

Preferably, the said shaping drum also comprises turning devices for the assembly of the axially inner edges of the said sidewalls on to the corresponding surface portions of the said sleeve.

Finally, the aforesaid drum preferably comprises securing devices for fixing the said sidewalls to the said drum during their positioning thereon.

BRIEF DESCRIPTION OF THE DRAWINGS

Further characteristics and advantages will be made clearer by the detailed description of a preferred, but not exclusive, embodiment of a shaping method and drum for manufacturing a tyre for vehicle wheels, according to the present invention.

This description is given below with reference to the attached drawings, provided solely for information and therefore without restrictive intent, in which:

FIG. 14 shows, in a simplified partial longitudinal cross section, a preferred embodiment of the mechanism of the securing device;

FIG. 15 shows schematically the layout of a tyre building plant comprising a pair of shaping drums according to the invention.

DETAILED DESCRIPTION OF THE EXEMPLARY EMBODIMENTS

Figure 1:
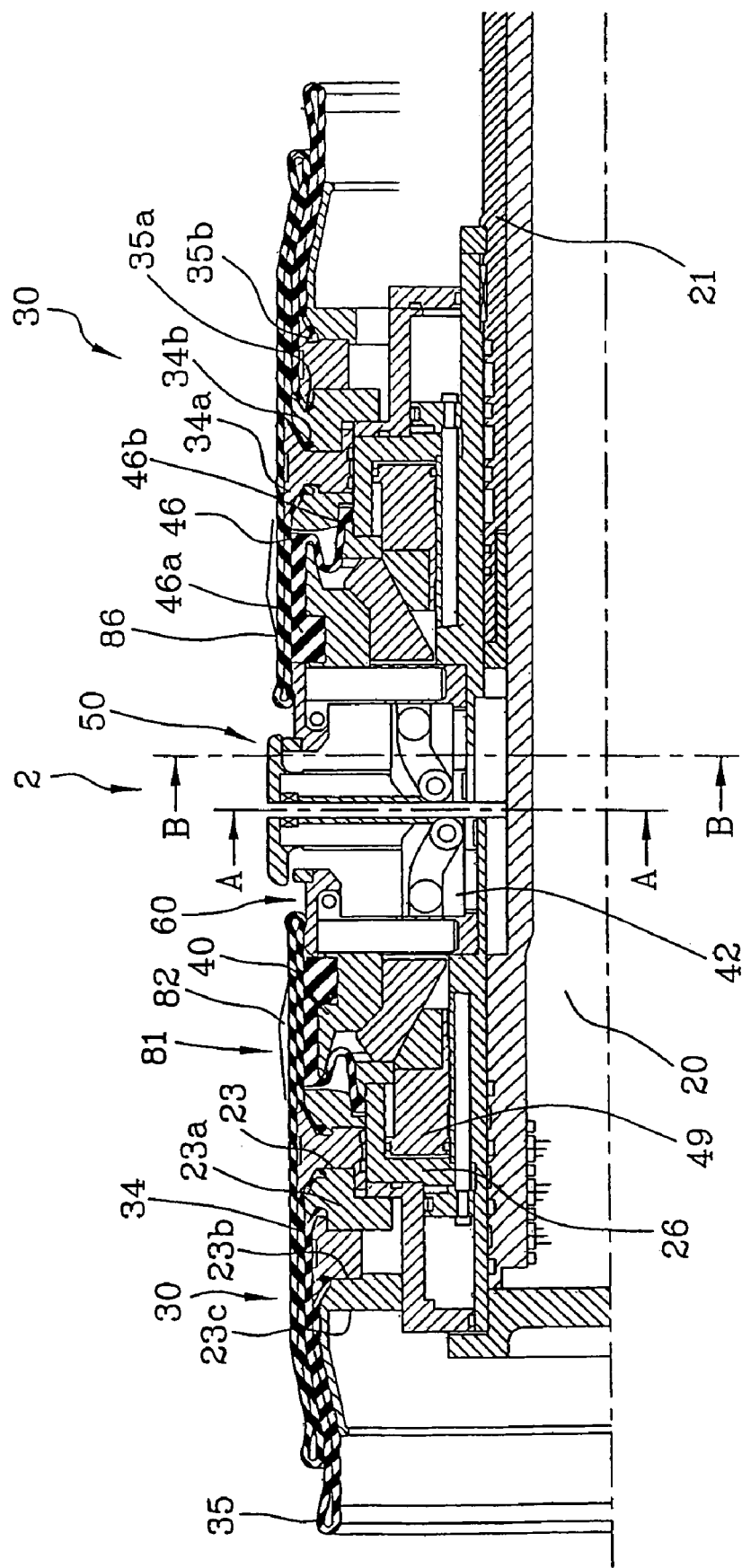
FIG. 1 shows schematically in partial cross section a shaping drum for manufacturing tyres according to the present invention, in the rest position, ready to receive a casing sleeve prepared elsewhere, the sidewalls of the tyre having been placed on corresponding expandable portions of the said drum.

FIG. 1 shows, in partial longitudinal cross section, a drum 2 for manufacturing tyres for vehicle wheels, and, more precisely, a drum called a "second step" drum, in other words a drum for the toroidal shaping of a cylindrical casing sleeve built elsewhere in a different operating step, usually known as the first step.

The drum 2 comprises a rotation shaft 20, with one of its ends fitted on a driving motor unit 1 (FIG. 15) from which the shaft projects, the motor unit being of a known type and not relevant for the purposes of the present invention.

On the opposite end of the said shaft 20 there are mounted the support elements and the operating devices which are described below and which, taken together, form one half of the said drum.

A tube 21 is fitted coaxially on the shaft 20, and is movable telescopically between the ends of the said shaft, in other words movable axially in both directions with respect to the said ends, but is integral with the said shaft 20 with respect to rotation.

On the said tube 21 and integrally with it there are mounted devices which are completely identical to and essentially mirror images of those mounted on the shaft 20, and which are therefore not described separately and which are identified by the same numerical references as those used for the devices mounted on the shaft 20; taken together, the tube and the corresponding devices form the other half of the said drum.

The drum 2 will be described with particular reference to the solution required for building tyres provided with beads having different fitting diameters, but this description is given without any restrictive intent; a person skilled in the art will easily understand how the dimensions of the mechanical elements of one half of the drum have to be modified to enable the drum to operate with tyres having the same fitting diameter for both beads.

Essentially, as shown in FIG. 1, the shaping drum comprises two coaxially aligned half-drums, movable axially with respect to each other, but integral with each other with respect to rotation, on each of which are formed tubular support devices 23 for the positioning of the sidewalls and expandable devices 30 for assembling the sidewalls on to the casing sleeve, radially expandable gripping devices 40 for engaging a casing sleeve on the drum by the beads of the sleeve, and centring devices 50 for positioning of the said sleeve and keeping it in a centred position on the said drum 2.

Preferably, the drum 2 also comprises turning devices 60 for assembling the axially inner edges of the said sidewalls on to the corresponding surface portions of the sleeve.

Preferably, the drum 2 also comprises securing devices 70 (FIG. 14) for fixing the said sidewalls to the drum during their positioning thereon.

On the projecting end to of the said shaft 20, in other words on the end opposite the driving motor unit 1, there is mounted a tubular support device 23, coaxial and integral with the said shaft, comprising different sections 23a, 23b and 23c, which are connected axially to each other but are preferably of different diameters, which decrease axially outwards, the radially outer surface of which is conveniently associated with the said radially expandable device 30 which comprises at least one inflatable chamber 34, engaged circumferentially around the tubular support 23 and extending axially between two ends at which the chamber 34 is turned back on to itself to form a support surface for a constituent element 81 of the tyre to be built. The said element comprises at least one strip 82 of elastomeric material for making a sidewall of the tyre.

Preferably, there are at least two inflatable chambers 34 and 35, axially staggered with respect to each other, a second inflatable chamber 35 being provided in an axially outer and radially inner position with respect to the chamber 34, in such a way that it is at least partially covered by the said chamber 34.

Figure 6:
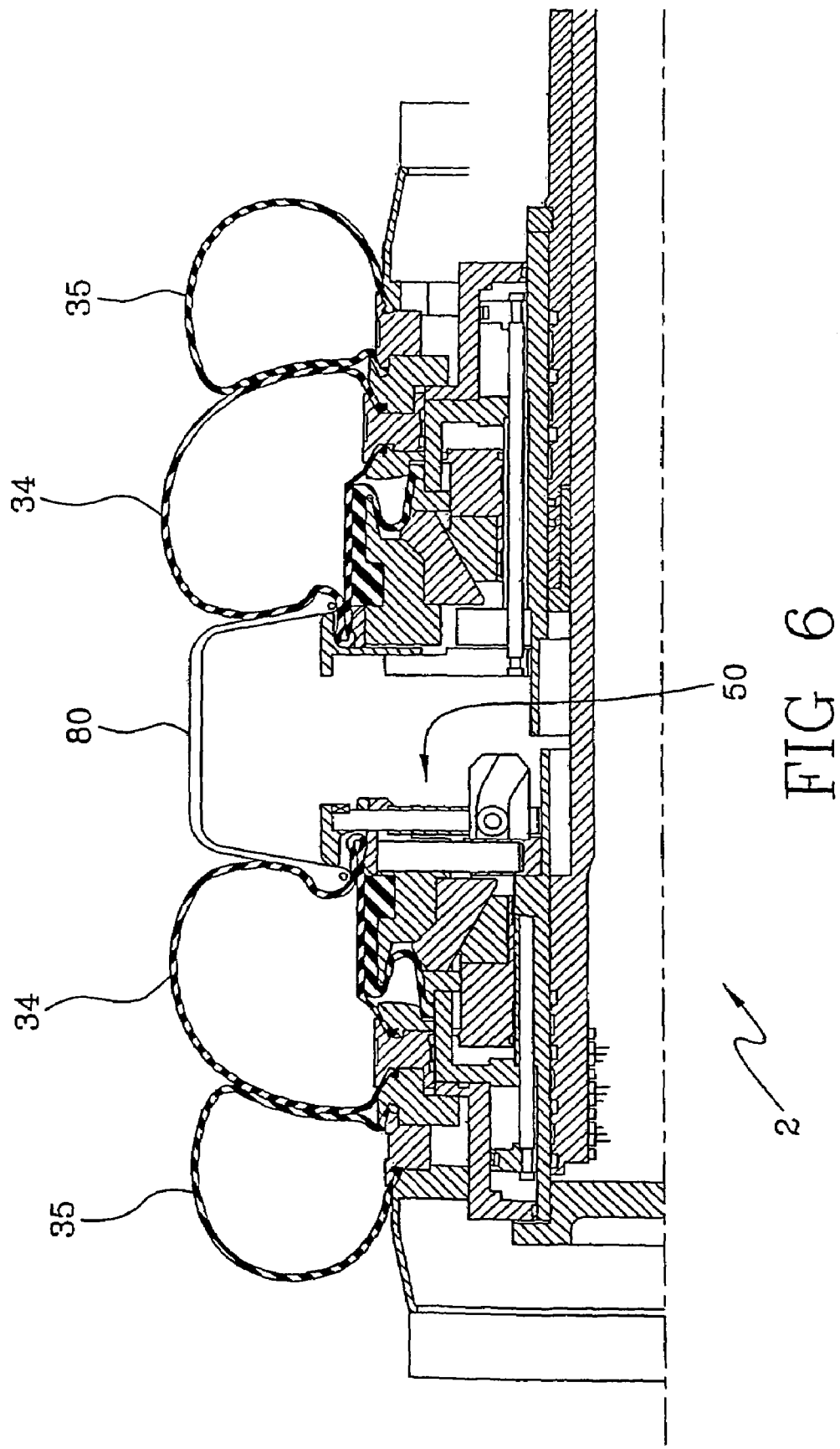
FIG. 6 shows the shaping drum in an operating step in which the sidewalls are applied to the axially outer lateral portions of the shaped casing sleeve.
Figure 7:
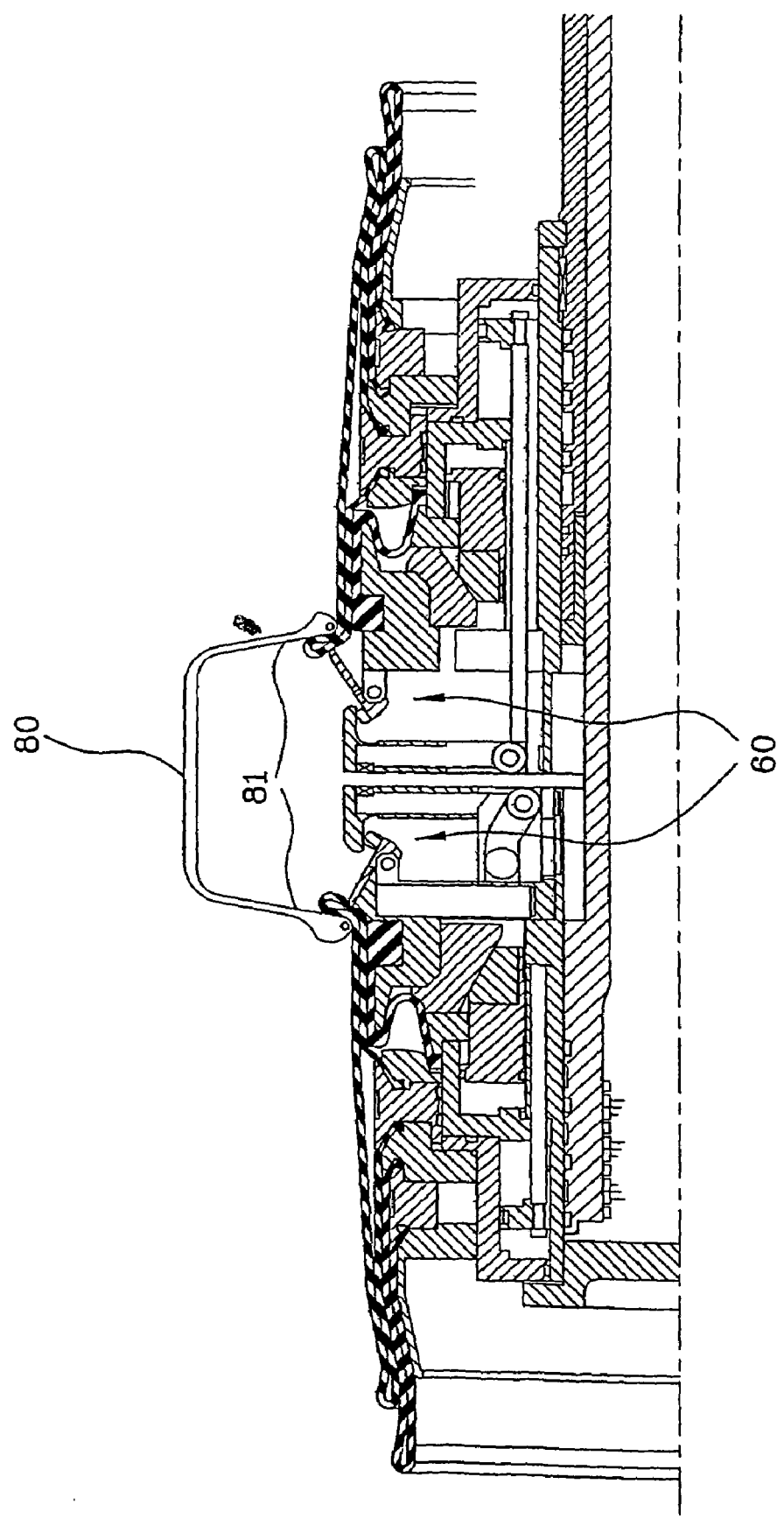
FIG. 7 shows the shaping drum in an operating step in which reinforcing elements are applied to the axially inner lateral portions of the shaped casing sleeve.

The chambers 34 and 35 have, in a known way, suitable beads 34a, 34b, 35a and 35b for securing the said chambers 34 and 35 to the radially outer surface of the tubular support 23 by means of suitable recesses formed in the different parts 23a, 23b and 23c of said tubular support 23. The external surface of the tubular support 23 is preferably shaped in such a way as to allow the chamber 34, in the rest position, to be positioned on a preferably cylindrical surface coaxial with the said shaft 20. Each inflatable chamber 34 and 35 can be deformed, by injection of a pressurized hydraulic fluid, from a rest position in which, as shown in FIG. 1, it has an essentially cylindrical shape and is flattened against the outer surface of the tubular support 23, and an expanded condition in which it assumes an essentially toroidal shape, as shown in FIG. 6. When the chambers 34 and 35 are inflated, the aforesaid strip 82 of elastomeric material positioned on each of the said chambers is made to push against the lateral surface of the said shaped casing sleeve 80 (FIG. 6) to form the sidewall 81 of the tyre.

Each set of these devices is also referred to globally hereafter as the shoulder of the drum; as stated previously, the said shoulders are integral with each other with respect to rotation and movable with respect to each other in the axial direction between a position of minimum spacing, when the drum is closed, and a position of maximum axial extension, when the drum is open. It should also be pointed out that the shoulder of the drum described here as integral with the shaft 20 can also be axially movable with respect to the said shaft.

Figure 4:
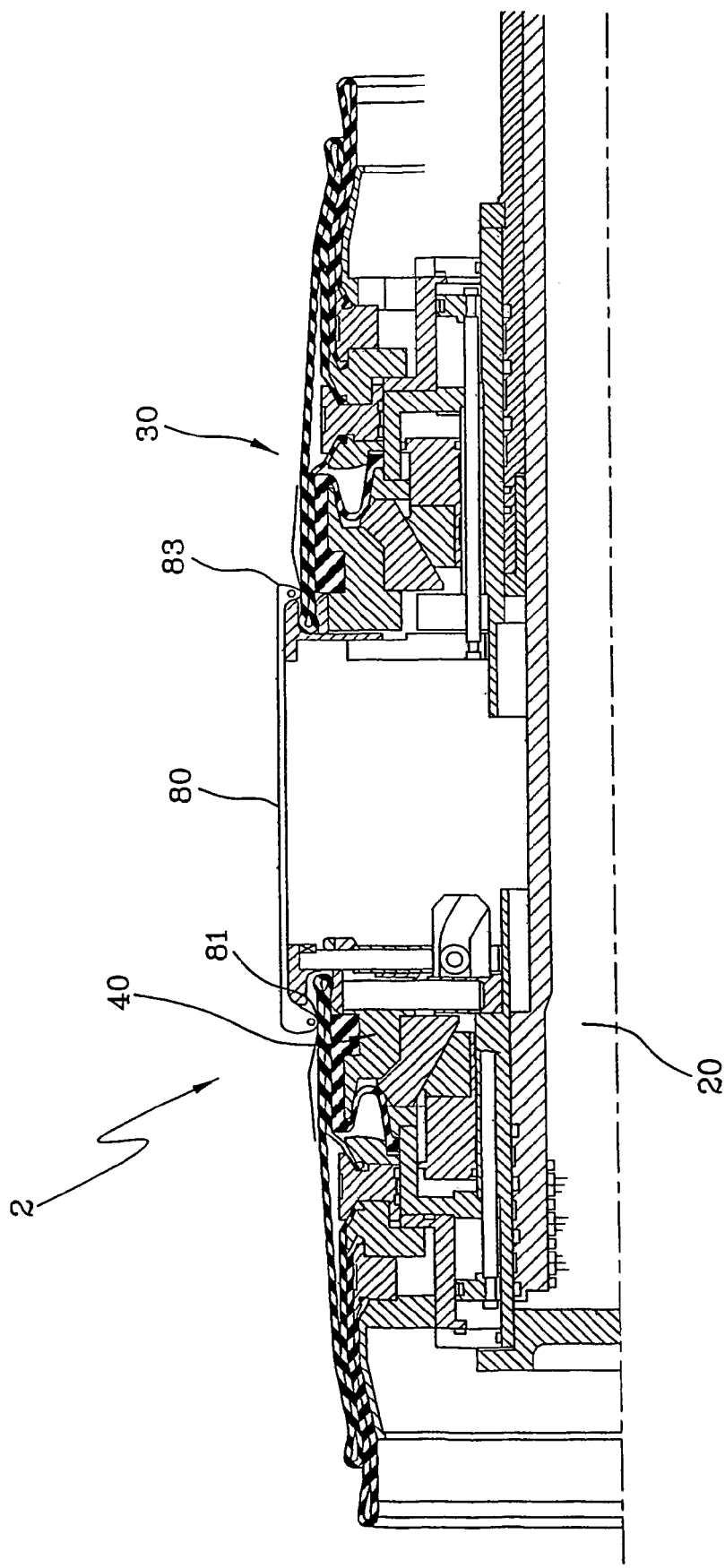
FIG. 4 shows the drum of FIG. 3 in an operating step in which, following the radial expansion of a gripping device of the drum, the casing sleeve is engaged at its beads.
Figure 5:
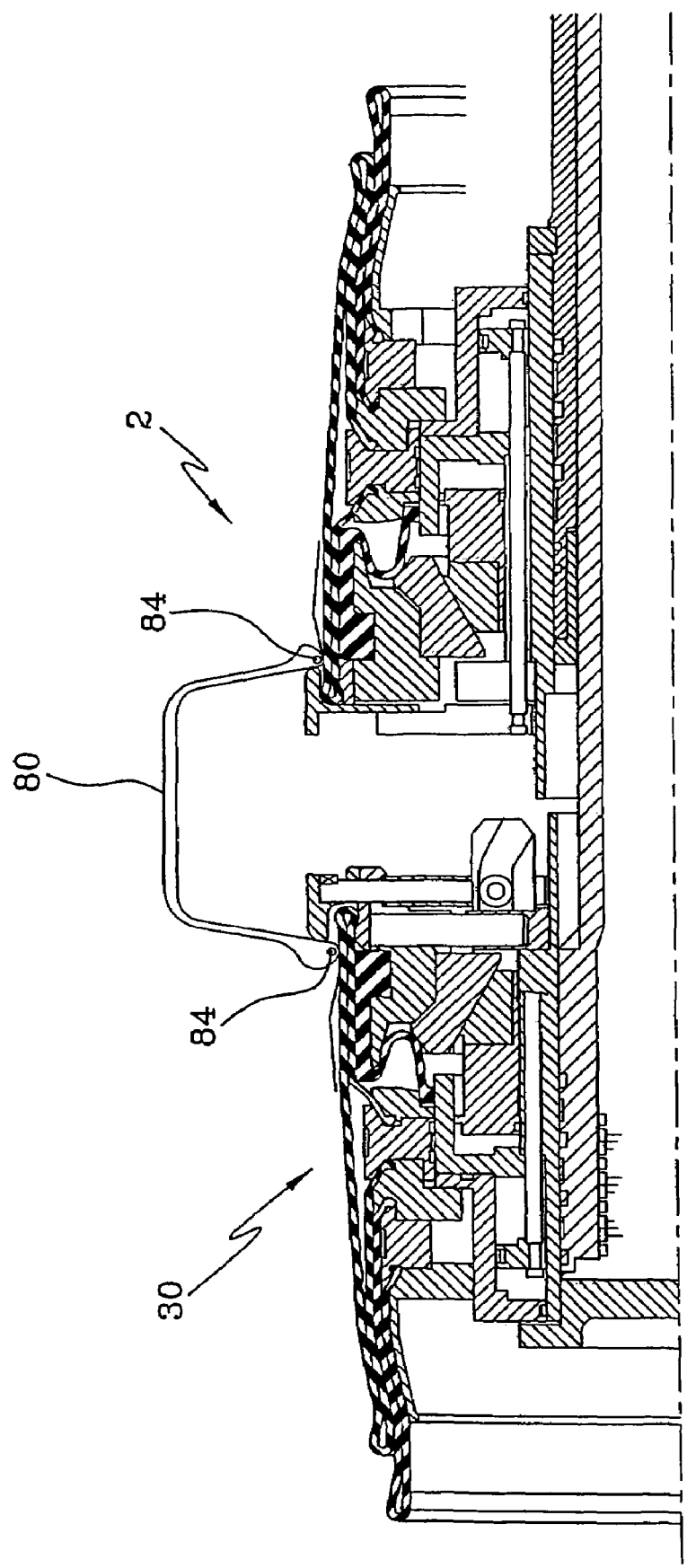
FIG. 5 shows the shaping drum in an operating step in which, following the axial movement towards each other of the half-drums which make up the drum, in conjunction with the inflation of the casing sleeve, the latter has assumed a toroidal shape.

On the rotation shaft 20, in an axially inner position with respect to the corresponding shoulder, there are radially expandable gripping devices 40, for holding (FIG. 4) the casing sleeve 80 on the drum 2 by the beads 83 of the sleeve.

Figure 12:
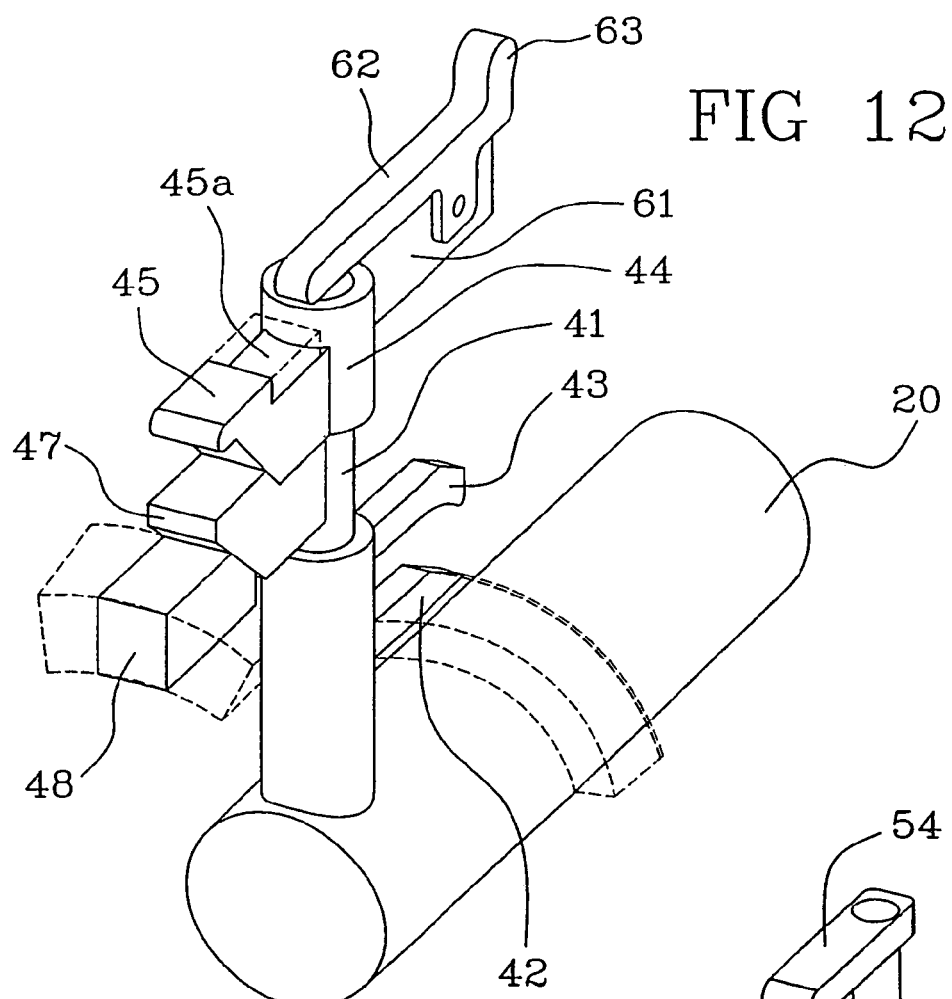
FIG. 12 is a perspective view of a preferred embodiment of the mechanism of a gripping device.

Now that the purpose of these devices is known, a person skilled in the art will have no difficulty in designing an equivalent alternative mechanism which is more suited to his requirements and objectives. According to a preferred embodiment chosen by the applicant, the said devices 40 comprise (FIG. 12) a plurality of radial pins 41, distributed with circumferential spacing between them around the rotation shaft 20. The radially inner portions of the said pins are integral with a first guide 42 extending longitudinally along the shaft 20, which has its radially outer surface extending axially from an axially outer end, in contact with the pin 41, of greater diameter, to an axially inner end, spaced apart from the said pin, of smaller diameter. In other words, on moving along the radially outer surface of the said guide 42 in the axial direction towards the outside of the drum 2, one would pass from a smaller diameter to a greater diameter; in other words one would be moving radially outwards. This guide 42 is shown in FIG. 12 as a flange of limited circumferential size, projecting from the said pin 41, but, preferably, the portion shown in the said FIG. 12 is part of a ring coaxial and integral with the said shaft 20, with the radially outer surface shaped as stated, as shown in the longitudinal cross section of FIG. 1 and in the portion in broken lines in FIG. 12.

Moving along the said guide 42 in the axial direction towards the outside of the drum 2, there is a first portion having a marked inclination, linked to a second portion which is essentially flat and rectilinear, which, as shown in greater detail below, enables the centring devices 50 to move axially with respect to the equatorial plane defined by the said gripping devices 40.

In a position radially external to the said first guide 42 there is provided, integrally with the said pin 41, a second guide 43 having its radially inner surface essentially parallel to the radially outer surface of the said first guide 42. The set of the two guides 42 and 43 thus forms a fixed path for a movable element which is described below.

On the radially outer portion of the said pin 41 there is a bush 44, longitudinally slidable but fixed with respect to rotation, on which is mounted, integrally with the said bush, a shoe 45 extending longitudinally along the axis of the drum 2 and facing axially outwards.

The radially outer surface of the said shoe 45 is shaped in such a way as to have a housing 45a which can contain a ring 46a of elastomeric material which is fitted around the whole plurality of shoes distributed circumferentially around the geometric axis of the shaping drum 2. Preferably, this ring 46a forms the axially inner bead of a flexible membrane 46 with two beads (46a and 46b) which has its axially outer bead 46b fixed in the corresponding shoulder of the drum. The two membranes 46, one on the shaft 20 and one on the tube 21, isolate the axially inner portion of the drum with a fluid-tight seal in order to permit, as will be seen, the inflation and the toroidal shaping of the sleeve 80.

Figure 2:
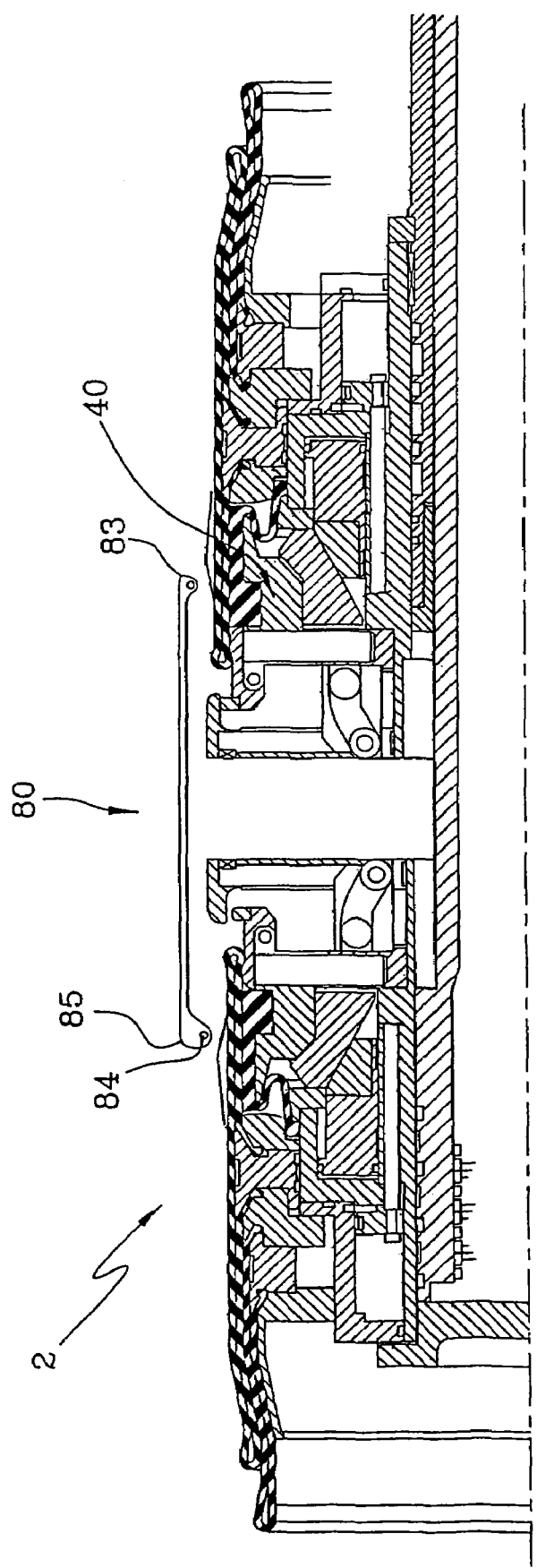
FIG. 2 shows the drum of FIG. 1 during the fitting of the first-step sleeve, which has now been brought to a centred position on the drum.
Figure 3:
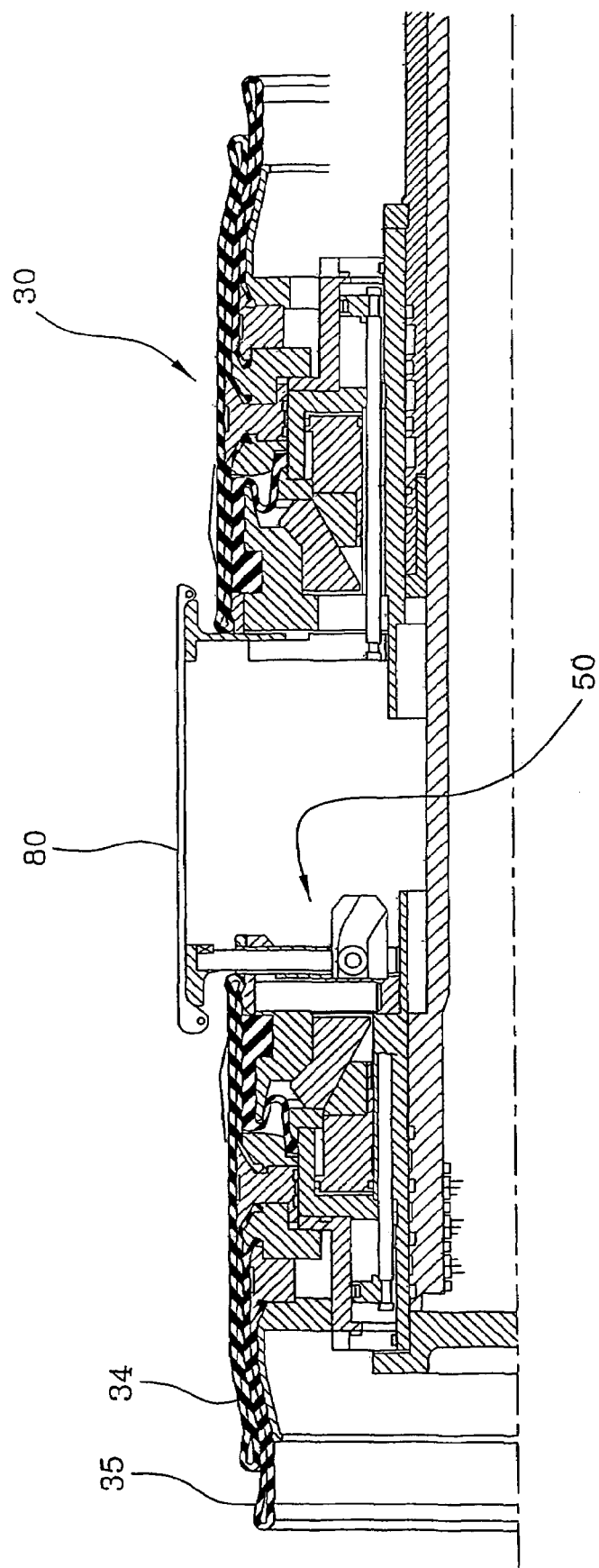
FIG. 3 shows the drum of FIG. 1 with elements for centring the casing sleeve in the operating position, bearing against the inner surface of the sleeve.
Figure 8:
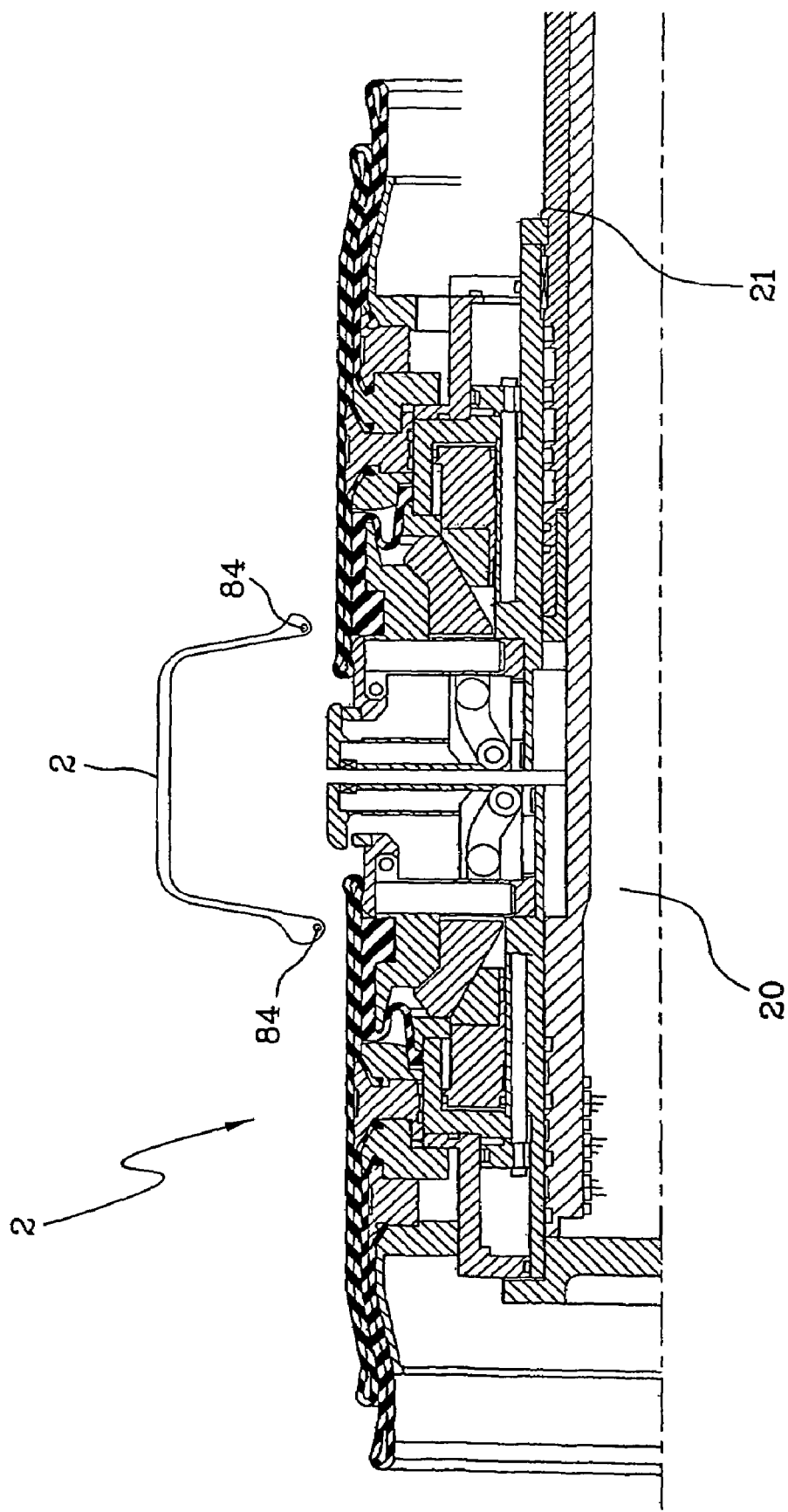
FIG. 8 shows the shaping drum returned to the rest position to enable the green tyre to be removed from the aforesaid drum.

The aforesaid shoe 45 bears on a corresponding block 47 inserted between the said shoe 45 and an operating device 48 which can be activated by at least one fluid-dynamic actuator and which causes the shoe 45 to move radially between a rest condition, in which it is radially withdrawn from the beads 83 of the sleeve, to permit the axial fitting of the casing sleeve 80 on to the shaping drum, as shown in FIG. 2, and the removal of the tyre on completion of the building process, as shown in FIG. 8, and an operating condition, in which, as shown in FIGS. 4 to 7, it pushes against the beads 83 of the aforesaid sleeve.

Preferably, the said fluid-dynamic actuator comprises a piston 49 coupled to the aforesaid device 48 along a conical surface coaxial with the drum 2 and facing axially outwards, with its vertex on the axis of rotation of the drum in an axially inner position; as a result of this coupling, a longitudinal movement of the piston 49 axially towards the interior of the drum causes the radial outward movement of the block 47 and of the shoe 45 associated with it. The returning radially inward movement of the shoe 45 can be provided by the elastic ring 46a, which has expanded during the radial expansion of the shoes. Additional devices (not illustrated) can be provided alternatively or simultaneously to facilitate or produce this return movement, such as dovetail joints between the corresponding conical surfaces of the block 47 and the device 48, or springs acting directly on the block and/or on the said device.

The device 48 is shown in FIG. 12 as a strut of limited circumferential size, but, preferably, the portion shown in the said figure is part of a ring coaxial with the said shaft 20, with its radially outer surface conical as stated above, as shown in the longitudinal cross section of FIG. 1 and in the portion in broken lines in FIG. 12.

The said ring 48 is axially slidable within a cylinder 26 keyed on the rotation shaft 20 and closed at its axially outer end; an operating fluid is injected into the said cylinder 26, between the closed end and the axially outer surface of the piston 49, causing the axial movement of the said piston. Suitable sealing rings prevent the leakage of the fluid out of the cylinder 26 along the radially outer surface of the piston 49.

According to the invention, the drum 2 can be provided with turning devices 60 for assembling the axially inner edges of the said sidewalls 81 on to the corresponding surface portions of the sleeve 80.

Now that the purpose of these devices is known, a person skilled in the art will have no difficulty in designing an equivalent alternative mechanism which is more suited to his requirements and objectives. In a preferred embodiment (FIG. 12), these devices 60 comprise, again with reference to only one of them, a flange 61 integral with the bush 44, extending axially from the said bush towards the interior of the drum.

On the said flange 61 there is pivoted, with an axis of rotation perpendicular to the plane of the longitudinal cross section of the drum, a lever 62 which has its axially outer end resting on the radially inner end of the said bush 44; preferably, its axially inner end is provided with a tooth 63 extending radially outwards.

It will be easily understood that a force applied to the tooth 63, or to the corresponding end of the lever 61, in a radially inward direction, will make the lever rotate about its axis of rotation, thus raising its axially outer end in a radially outward direction.

Figure 13:
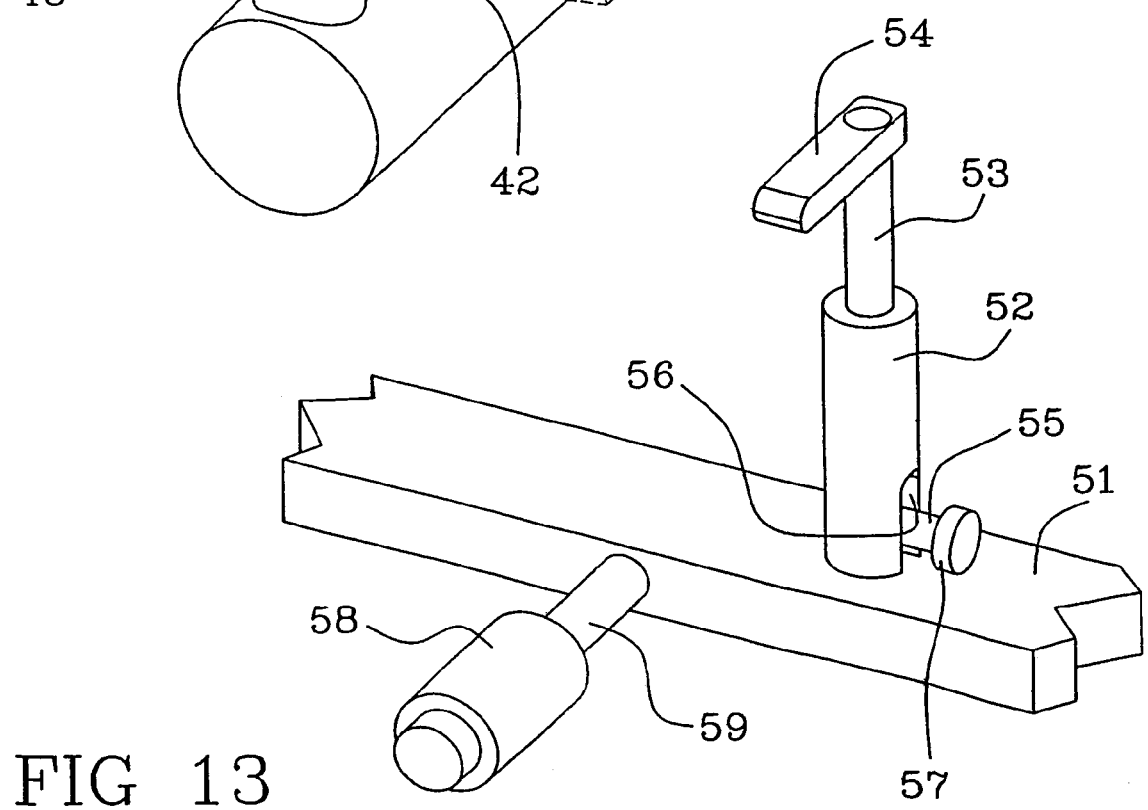
FIG. 13 is a perspective view of a preferred embodiment of the mechanism of a centring device.

Also according to the invention, the drum 2 additionally comprises centring devices 50 (FIG. 13) for the positioning of the said sleeve 80 on the said drum and for keeping it in a centred position. Now that the purpose of these devices is known, a person skilled in the art will have no difficulty in designing an equivalent alternative mechanism which is more suited to his requirements and objectives. In a preferred embodiment, the said devices 50 comprise a ring 51, coaxial with the drum 2 and axially slidable on the said shaft 20, carrying on its radially outer surface a plurality of cylinders 52, extending radially outwards and distributed circumferentially with spacing between them. FIG. 13 shows only one of the said cylinders 52, mounted on a limited circumferential portion of the said ring 51, which for the sake of simplicity is shown as being straight.

Within the said cylinder 52 there is a radially slidable piston 53 which carries on its radially outer end an element (centring piece) 54 positioned parallel to the axis of the drum 2 and extending longitudinally outwards.

The radially inner end of the said piston 53 is integral with one end of a pin 55, which is perpendicular to the radial plane containing the axis of the piston 53 and the axis of rotation of the drum, and which is slidable within a longitudinal recess 56 formed in the lateral wall of the cylinder 52. This pin 55 carries on its opposite end a roller 57 which rotates freely with respect to the axis of the said pin 55. The diameter of the said roller 57 is essentially equal to the aperture, in other words the radial dimension, of the aforesaid fixed path formed between the said first and second guides 42 and 43. In particular, the ring 51 is mounted on the shaft 20 with an angular orientation with respect to the gripping devices 40, in such a way that the cylinders 52 of the centring device 50 are positioned alternately with the pins 41 of the gripping device 40, with the rollers 57 on the aforesaid fixed path. At least one operating device, but preferably at least two devices, located with equal circumferential spacing between them, move the aforesaid ring 51 axially. Preferably, the said operating device comprises a fluid-dynamic actuator of the cylinder and piston type, with the cylinder 58 integral with the shaft 20 and the piston 59 integral with the ring 51.

The operation of the mechanism is evident: the movement of the ring 51 towards the end of the drum moves the piston 53 in an axial direction and forces the roller 57 to move along the fixed path on the radially outer surface of the guide ring 43, thus causing a simultaneous radial outward movement of the said piston 53 and of the centring piece 54 connected to it.

It should be noted that, when the piston 59 is operated, the movement of the roller 57 within the said fixed path, which as stated previously includes a straight portion because of the shaping of the first guide 42, will cause an axial movement of the centring devices 50, and consequently of the equatorial plane defined by them, with respect to the equatorial plane defined by the gripping devices 40 mounted on the said half-drums of the shaping drum 2.

Known devices (not illustrated), preferably of the elastic type, are provided to vary the length of the piston 53 in such a way that the said centring device 50 can be used with casing sleeves having diameters lying within a predetermined range of values. For example, a simple and advantageous embodiment of the said elastic devices comprises a compression spring fitted between a radially inner portion and a radially outer portion of the said portion 53, which is conveniently made in telescopic form.

It should be noted that the type of mechanism provided for the centring device 50 (with actuators 58 and 59 provided on both shoulders of the drum) makes the positioning of the centring pieces 54 independent of the axial position of the shoes 45; thus it becomes possible to vary the axial centring position of the sleeve with respect to the equatorial plane of the drum which is equidistant from the axially opposed shoes 45, with the advantages described below.

Preferably, the drum also comprises securing devices 70 for fixing the elastomeric strips 82 to the surface of the drum 2 during their positioning on the shoulders of the said drum. The said securing devices 70 preferably comprise at least one clamping member 71 movable radially and axially with respect to the shaping drum 2, provided on each half of the drum. More particularly, the clamping member 71 (FIG. 14) is movable between a rest position, in which it is disengaged from the edge of the strip 82 and positioned on the shaping drum 2 in such a way as to form an axially inner shoulder with respect to the axially outer edge of the bead ring 46a of the chamber 46, and an operating position, in which it forms an axially outer shoulder with respect to the axially inner edge of the said bead ring 46a and acts on a edge of the corresponding strip 82 of elastomeric material supplied from a sidewall feed unit 3 (FIG. 15) to secure it on the outer surface of the shaping drum. This clamping member 71 moves in space and time independently of the movements of the other gripping devices 40 and centring devices 50. Where its mechanism is concerned, preferably this is entirely identical to that of the centring devices 50, or alternatively to that of the gripping devices 40, and therefore its description is not repeated here: it is simply pointed out that, unlike the centring devices 50, the clamping members 71, when operated, have to move radially inwards to secure the said strips 82, and not radially outwards. It should also be noted that the drum has only one pair of axially opposed clamping members 71, while the centring devices 50 are circumferentially distributed over the whole perimetric extension of the drum. In any case, now that the purpose of these clamping members 71 is known, a person skilled in the art will have no difficulty in designing an equivalent alternative mechanism which is more suited to his requirements and objectives.

It is also clear that, in order to simplify the architecture of the drum, the said clamping members 71 can be replaced by equivalent devices which are external to the drum and do not form part of it.

The drum 2 described above is designed for the execution of the operations which, in a two-step building process, lead to the completion of tyre casings, prepared in the form of cylindrical sleeves 80 during a first step of the said process.

A tyre for vehicle wheels is, in general terms, a known structure which does not require detailed description here. It essentially comprises a casing sleeve 80 (see FIG. 2) reinforced with at least one casing ply which has circumferential axially opposed flaps turned in a loop around corresponding annular reinforcing structures which, in the finished tyre, are embedded in the areas usually known as "beads" 83, located in the inner circumferential edges of the tyre. As shown in FIG. 2, each annular reinforcing structure comprises at least one circumferentially inextensible annular insert 84, usually called the "bead wire", and an elastomeric filler 85 applied in a position radially external to the bead wire.

The casing sleeve 80 is associated, in a radially outer position, during a step E), with an outer sleeve having a belt structure usually comprising one or more belt strips. A tread designed to provide the contact surface of the tyre with the running surface is applied in a position radially external to the belt structure.

On the lateral surfaces of the casing structure 80, each extending radially from one of the beads 83 to the crown portion of the casing 80, there are applied corresponding sidewalls 81 of elastomeric material. In tyres requiring a reinforcing element in a position axially inside the bead 83, such as the tyre of a new type mentioned above, the said reinforcing element preferably consists of a sheet 86 of elastomeric material, having suitable rheometric characteristics, which may also include a fibre, textile or metallic reinforcement pre-assembled on to the strip of elastomeric material of the sidewall 81 on its edge facing the bead 83. In the remainder of the present description, the term "sidewall" will be frequently and exclusively used, for the sake of simplicity, even when the sidewall comprises the aforesaid reinforcing sheet.

In the toroidally shaped casing, each sidewall conveniently has a radially inner terminal edge which can extend axially from the outside to the inside around the corresponding annular reinforcing structure 84, and a radially outer terminal edge which can be laterally superimposed on the corresponding lateral edge of the tread, to form a structural system of the type usually called "sidewalls over", or can be interposed between the casing structure and the lateral edge of the tread, in a structural system of the type called "sidewalls under".

This casing structure is initially prepared, in any way convenient to the person skilled in the art, in the form of a cylindrical sleeve, usually called the "casing sleeve" 80, incorporating the annular reinforcing structures in the beads facing radially towards the geometric axis of the sleeve, as in FIG. 2.

In particular, the attached figures show a casing sleeve provided with beads having different fitting diameters, but this is done solely in order to provide greater detail and without any restrictive intent, since the invention is applicable to any type of tyre.

The casing sleeve prepared in this way is now ready to be transferred to the shaping drum 2 according to the invention. It should be pointed out here that the drum according to the invention can also be used for mounting the casing sleeve in an off-centre position with respect to the equatorial plane of the drum; in this case also, for simplicity, the term "centred position" will continue to be used in the course of the present description.

Before the casing sleeve 80 is transferred to the said drum 2, and if the sleeve has not already been provided with sidewalls 81 assembled on to it during the first-step operation, the sidewalls are positioned on the shaping drum. This operation can be carried out even after the casing sleeve 80 has been secured on the gripping device 40 of the shaping drum, but, in this case, it will no longer be possible to lay down a sidewall having an inner terminal edge to be turned around the corresponding annular reinforcing structure, since the sidewall can be laid down only in a position axially external to the aforesaid annular reinforcing structure. The operation is preferably carried out by feeding on to each of the half-drums of the shaping drum at least one strip of elastomeric material designed to form one of the sidewalls. More particularly, the strip can be, for example, drawn from a feed reel or other continuous supply device, and guided towards a corresponding application area positioned tangentially with respect to the shaping drum, as shown in FIG. 15, this being done in a known way.

The operating sequence for the purposes of a step F) for positioning the sidewalls essentially requires the shaping drum to be rotated angularly until the clamping members 71 are brought close to the ends of the strips of elastomeric material which have been positioned in the application area by means of guide elements. In this step, the clamping members 71 are moved axially and radially until they are brought into the operating position in which they engage the ends of the strips of elastomeric material in the corresponding application areas of the shaping drum. The shaping drum is then rotated to wind on a complete turn of the strips of elastomeric material, drawn from the aforesaid supply devices 3. Simultaneously with the said winding, the strips of elastomeric material are cut to size by suitable cutting members associated with the said guide elements, in such a way that the opposite ends of each length which is produced come into contact with each other to form a joint, preferably of the chamfer type, on the shaping drum. The final joint between the ends can be formed manually by an operator or by means of suitable devices, for example known roller devices which are not illustrated. On completion of the winding, the clamping members 71 are returned to the rest position and each of the sidewalls, as shown in FIG. 1, is essentially shaped in the form of a cylindrical ring with a cross-sectional profile extending axially with respect to the shaping drum. Preferably, the axially inner terminal edge of each sidewall is also made to be at least partially superimposed on the bead ring 46a of the gripping device 40 provided on the shaping drum for engagement with the casing sleeve 80.

The casing sleeve 80, removed from the building drum 4 (FIG. 15) by the radial contraction of the latter, is transferred (FIG. 2) on to the shaping drum 2 according to the invention, by means of a transfer device 5 (FIG. 15), which is not illustrated in detail since it is known and is not relevant. On reaching the shaping drum 2, the said casing sleeve 80 is positioned or fitted on it during a step A).

The centring devices 50 (FIG. 2) are then operated, and these, by an axially and radially outward movement, come to bear on the inner surface of the casing sleeve 80, in the area of the beads 83, thus causing the aforesaid sleeve, at least during a step B in which the sleeve is secured to the drum, to take up a position which is radially centred with respect to the axis of rotation of the drum and axially centred with respect to a reference plane usually consisting of the equatorial plane of the drum 2.

However, it should be noted that the said equatorial plane of the shaping drum 2, in other words that defined by the gripping devices 40, can be different from the equatorial plane defined by the aforesaid centring devices 50, in other words from the equatorial plane of the casing sleeve 80. This possibility of changing the position of the casing sleeve along the shaft 20 is due, as stated above, to the fact that the position of the ring 51 with respect to the pin 41 is variable, within certain limits, independently of each half of the drum.

After the sleeve has been brought into a centred position with respect to the drum, the actuators are brought into operation to radially expand the shoes 45 of the gripping devices 40 (FIG. 4), thus bringing them into the corresponding operating position, to hold the casing sleeve 80 by the annular reinforcing structures 84.

In this step, carried out with the centring devices 50 still in the operating position, as shown in the said figure, the sidewall 81 is advantageously secured on to the radially inner surface of the bead 83 of the sleeve, thus ensuring the correct axial positioning of the ends of the sidewall with respect to the casing sleeve and the stability of the said positioning of the sidewall during the subsequent steps of the process.

The toroidal shaping of the sleeve 80 is then carried out by means of a step C). This operation is carried out by causing the component half-drums of the shaping drum 2 to approach each other axially, while simultaneously injecting an operating fluid into the casing sleeve 80, in such a way as to make it expand radially in a toroidal configuration. In this step, the casing sleeve is compelled to remain centred on the drum by the action of the centring devices 50 which continue to be kept in the operating position. The action of these devices against the annular reinforcing structures 84 also prevents any possibility of the unwinding of the casing ply around the bead wires.

The radially expandable devices 30 associated with the shoulders of the shaping drum 2 are then brought into action to cause, in a step D), the application of each sidewall 81 on to a corresponding lateral surface of the casing sleeve 80. In the preferred solution described initially, these devices 30 essentially comprise the pair of inflatable chambers 34 and 35 around which the strips 82 of elastomeric material, designed to form the sidewalls 81, have been wound.

Preferably, the sequence of operation of the inflatable chambers 34 and 35 is such that the first chambers 34 located in the axially inner position are initially inflated, to raise the sidewall 81 with respect to the outer surface of the shaping drum 2 and to turn up the said sidewall towards the lateral surface of the casing sleeve 80. The second chambers 35 are subsequently operated, to complete the application of the sidewalls and compress them against the casing sleeve.

The chambers 34 and 35 are then deflated and returned to their rest position; a rolling operation is then carried out to compact the sidewall strips against the sides of the casing.

In a known way, during the shaping operation or at any subsequent moment, before or after the application of the sidewalls, the sleeve 80 is also joined to the outer sleeve which carries the belt structure and the tread. This operation is also followed by a rolling of the said outer sleeve against the shaped casing sleeve.

During these steps, the centring devices 50 provide a forced axial centring of the casing sleeve, thus preventing any possible displacement of the sleeve from its centred position which might otherwise occur as a result of the forces generated by the rolling operation.

When required, a step G of turning the axially inner edge of the sidewall 81 on to the axially inner surface of the bead 83, in a position radially inside the casing 80, is then executed. The operation is carried out by returning the centring devices 50 to the rest position: in this step, during the radial inward movement, each end of a centring device presses radially inwards against the corresponding axially inner end of the lever of the turning device 60, causing its axially outer end to rotate about the pivot and consequently to move radially outwards. This movement moves the end of the inflatable chamber radially outwards, causing the inner edge of each sidewall 81 to be applied on to the surface of the sleeve.

At this point, the gripping devices 40 of the shaping drum 2 are also returned to the rest position to enable the built tyre to be removed.

Figure 9:
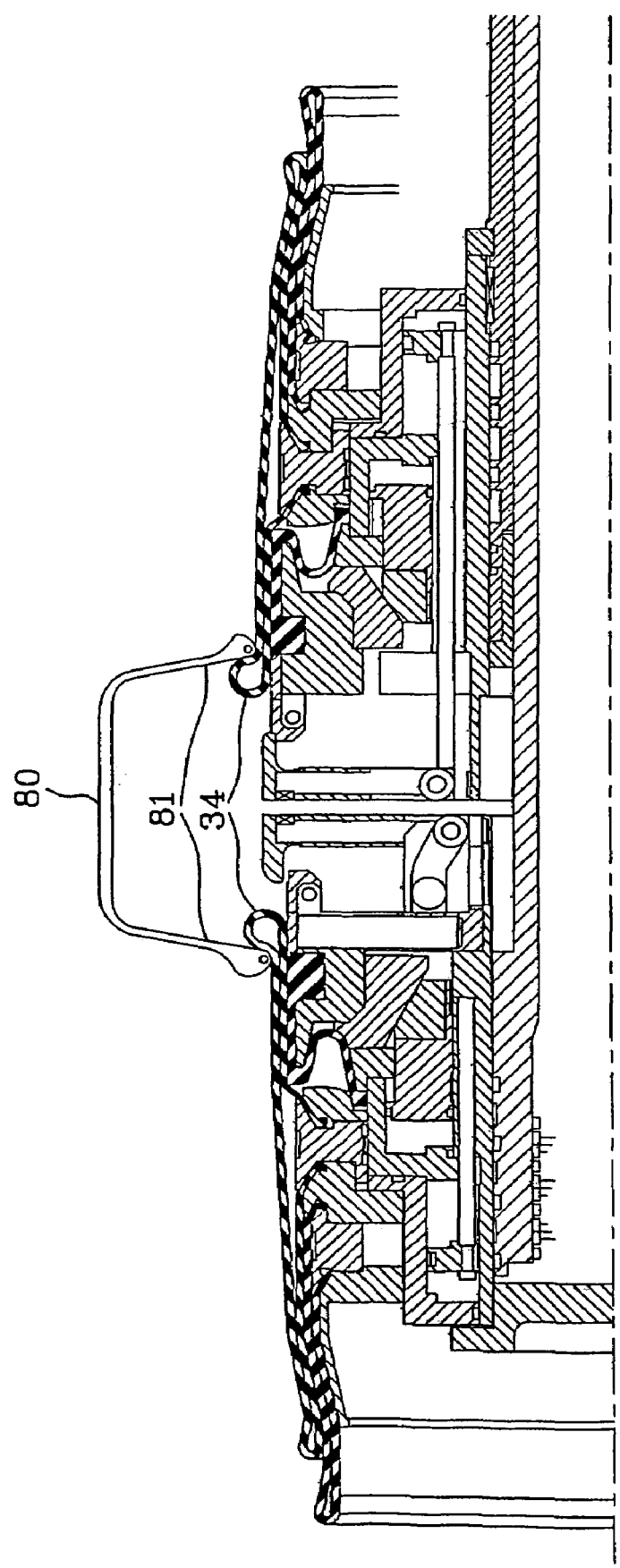
FIG. 9 shows the shaping drum in an operating step which is the same as that of FIG. 7, but carried out according to an alternative embodiment.
Figure 10:
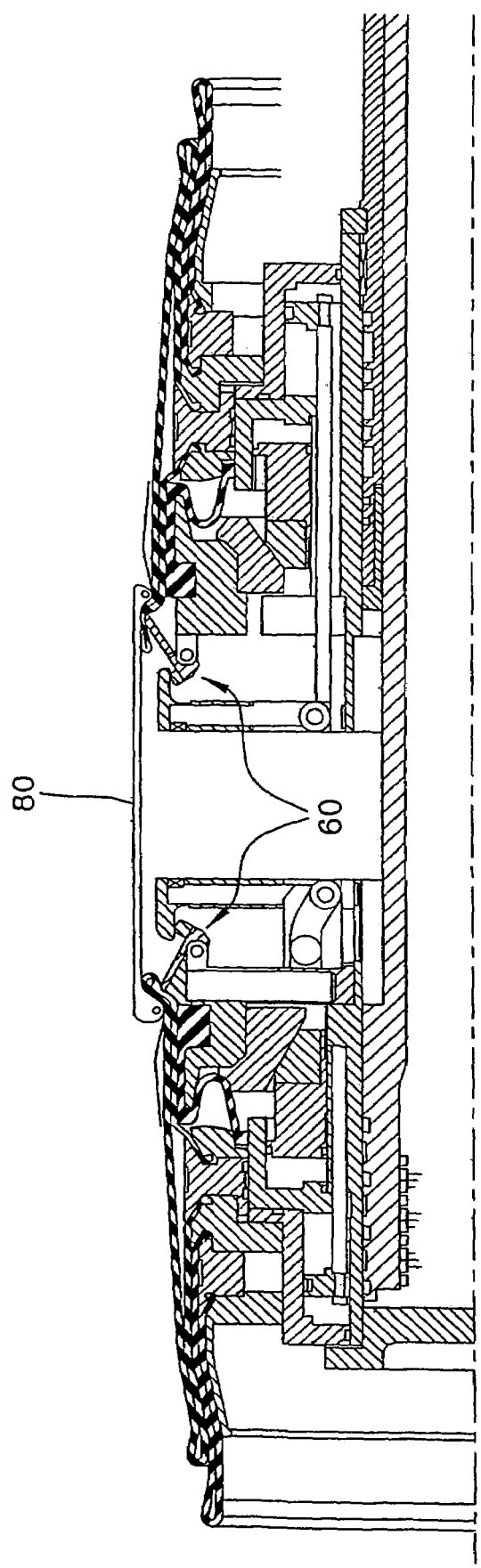
FIG. 10 shows the shaping drum in an operating step which is the same as that of FIG. 7, but carried out before the toroidal shaping of the sleeve.

Alternatively, as shown in FIG. 9, if the drum 2 is not provided with the aforesaid turning devices 60, the aforesaid turning operation can be carried out by inflating the axially inner terminal portion of the inflatable chamber 34, the said portion extending axially towards the interior of the said drum 2 until it passes beyond the axially inner end of the bead ring 46a, and being provided with its own inflation valve which enables the said axially inner terminal portion to be operated separately from the remaining portion of the chamber.

In another alternative variant of the method according to the invention, the step of turning the axially inner portion of the sidewall on to the axially inner surface of the bead is carried out before the toroidal shaping of the sleeve; in this case also, it can be carried out by means of the aforesaid turning devices 60, operated as stated.

In this case, as an alternative to the described process, the turning devices 60 can be used as elements for maintaining the centring of the casing sleeve 80 during the application of the outer belt sleeve.

Figure 11:
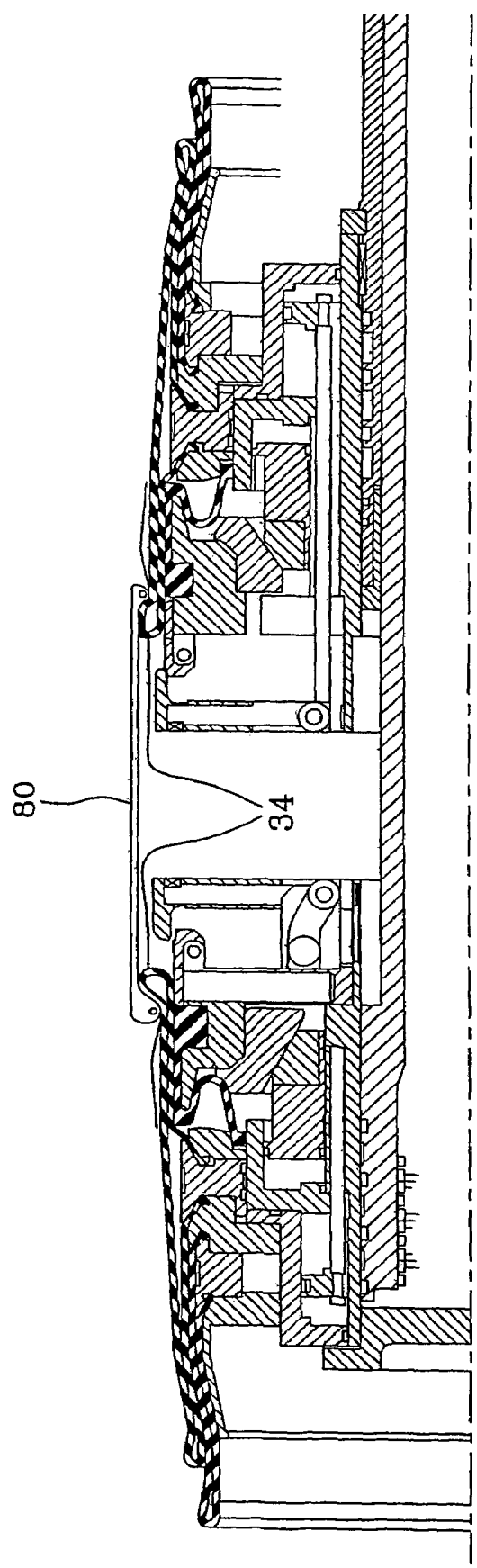
FIG. 11 shows the shaping drum in an operating step which is the same as that of FIG. 9, but carried out before the toroidal shaping of the sleeve.

Alternatively (FIG. 11), in the absence of the aforesaid turning devices 60, the turning can be carried out by separately inflating the axially inner terminal portion of the inflatable chamber 34.

In this alternative variant embodiment, the centring devices, removed to allow the said step of turning the axially inner portion of the sidewall, are returned to the sleeve centring position before the toroidal shaping of the sleeve is carried out.

Alternatively, it is possible, as stated, to use the turning devices 60 kept in the centring position.

The shaping drum 2 according to the invention can advantageously be used in a complete plant for building tyres by the two-step method. In particular, FIG. 15 shows a tyre building plant which has a first-step building drum 4, a device 5 for transferring the first-step sleeve 80, an auxiliary drum 8 for building the outer sleeve comprising the belt structure and tread, a device 7 for transferring the said outer sleeve, and at least one shaping drum 2 according to the present invention, supported by and projecting from a motor unit 1 mounted on a rotatable turret 6 designed to change the relative positioning of the said shaping drum 2, preferably by rotations of 180° about a vertical axis, between a position 2a for receiving the casing sleeve 80 and a position 2b for receiving the outer sleeve with the belt and tread.

Preferably, there is a pair of shaping drums 2 supported by and projecting from opposite sides of the said motor unit 1, in the said positions 2a and 2b respectively.

Advantageously, the use of two shaping drums in place of a single drum enables the operating cycle to be reduced, thus increasing the output of the plant accordingly.

At the position 2a of the shaping drum in which it is coaxial with the drum 4, there is also a feed device 3 for supplying the sidewall strips, and other semi-finished products which may be required, to the said shaping drum 2.

The present invention yields significant benefits.

As a result of the present invention, an absolutely precise initial centring of the sleeve on the shaping drum is achieved, even when the beads of the sleeve have different fitting diameters, which might cause the positioning of the equatorial plane of the sleeve not to be perpendicular to the axis of rotation of the drum.

The independence of the axial movement of the centring devices 50 with respect to the gripping devices 40 enables the casing ply of the sleeve 80 to be placed in tension in a cylindrical configuration independently of the width of the aforesaid sleeve, thus enabling the same shaping drum to be used for different grades of tyre.

Furthermore, the centring, particularly the axial centring, of the sleeve on the drum is ensured throughout all the tyre building operations, many of which require the application of considerable forces to the sleeve, particularly in the axial direction.

Additionally, the operation of turning the axially inner edges of the sidewalls in an axially inner position with respect to the beads is permitted, or in any case considerably simplified, whereas this operation is difficult to carry out in the known processes and with the -known building drums; the correct radial positioning of the edges of the sidewall on the casing sleeve is also ensured.

It should also be noted that the possibility of varying the axial path of the centring devices 50 with respect to the corresponding gripping devices 40 provides at least two further advantages. Firstly, it simplifies the sidewall feed system and facilitates the change of grade, since it allows the sidewalls to be deposited on the drum in the same relative axial position at all times, independently of the width of the first-step sleeve, thus making it unnecessary to adjust the feed unit 3 (FIG. 15) to allow for this width.

Secondly, the axial movement of the gripping device 40 with respect to the centring device 50, made possible by the drum according to the invention, enables the sidewalls to be deposited on the drum even after the sleeve has been received and centred with respect to the drum, in the absence of any interference between the said two devices: in particular, it enables a sidewall strip to be wound on to the said gripping device 40 so that it can subsequently be secured between the gripping device and the corresponding bead of the sleeve, the axially inner terminal edge of the said strip being thus fixed in an axially inner position with respect to the said bead.

The invention claimed is:

1. A method for building a tyre for a vehicle wheel, comprising:
    positioning a pair of sidewalls on a shaping drum;
    positioning a casing sleeve on the shaping drum, wherein the sidewalls are positioned with axially inner edges of the sidewalls in axially inner positions with respect to beads of the casing sleeve;
    securing the casing sleeve on the shaping drum;
    toroidally shaping the casing sleeve;
    applying the pair of sidewalls to lateral surfaces of the shaped casing sleeve;

turning the axially inner edges of the sidewalls onto axially inner surfaces of the beads of the casing sleeve; and applying an outer sleeve to a radially outer surface of the casing sleeve;

wherein during at least one of toroidally shaping the casing sleeve, applying the pair of sidewalls, and applying the outer sleeve, the casing sleeve is kept in an essentially centered position on the shaping drum by axial forces directed against axially inner surfaces of the casing sleeve, and wherein during at least one of positioning the casing sleeve and securing the casing sleeve, the casing sleeve is kept in an essentially centered position on the shaping drum by radial forces directed against a radially inner surface of the casing sleeve.

2. The method of claim 1, wherein turning the axially inner edges takes place before toroidally shaping the casing sleeve.

3. The method of claim 1, wherein turning the axially inner edges takes place after toroidally shaping the casing sleeve.

4. The method of claim 1, wherein turning the axially inner edges is carried out by inflating at least one inflatable chamber.

5. The method of claim 1, wherein turning the axially inner edges is carried out using turning devices made to act against radially inner surfaces of the axially inner edges.

6. The method of claim 5, wherein the turning devices are used as elements for maintaining the essentially centered position of the casing sleeve during applying the outer sleeve.

7. The method of claim 1, wherein positioning the sidewalls takes place before positioning the casing sleeve.

8. The method of claim 1, wherein positioning the sidewalls takes place after positioning the casing sleeve.

9. The method of claim 1, wherein for each sidewall, positioning the sidewalls comprises:

securing one end of a sidewall strip on a surface of the shaping drum before the strip is wound around the shaping drum.

10. A shaping drum for making a tyre for a vehicle wheel, comprising:

a rotation shaft; and two coaxial half-drums;

wherein the rotation shaft is connected for operation to the half-drums, wherein the half-drums are integral with each other with respect to rotation, wherein at least one of the half-drums is axially movable in both directions with respect to the other half-drum, wherein each half-drum comprises:

a support device;

a gripping device;

an elastic ring associated with the gripping device; and a centering device;

wherein the support device positions and applies a sidewall on a casing sleeve, wherein the gripping device secures one axially opposed bead of the casing sleeve on the half-drum, wherein the centering device positions one of the axially opposed beads on the half-drum, wherein a first equatorial plane defined by the centering devices is axially movable with respect to a second equatorial plane defined by the gripping devices, and wherein the elastic ring is configured to provide a fluid-tight seal, such that the casing sleeve is shaped into a toroidal configuration via an operating fluid.

11. The shaping drum of claim 10, wherein the gripping devices comprise first and second guides that delimit a fixed path for a moving element.

12. The shaping drum of claim 11, wherein the centering devices comprise a mechanism that, when operated, forces the moving element to move along the fixed path, thus varying the axial centering position of the casing sleeve with respect to the equatorial plane of the shaping drum.

13. The shaping drum of claim 10, further comprising:

turning devices for assembling the axially inner edges of the sidewalls onto corresponding surface portions of the casing sleeve.

14. The shaping drum of claim 10, further comprising securing devices for securing the sidewalls to the shaping drum during winding of sidewall strips onto the shaping drum.

15. A plant for building a tyre for a vehicle wheel, comprising:

a first-step building drum;

a device for transferring a first-step sleeve;

at least one shaping drum;

an auxiliary drum for building an outer sleeve;

a device for transferring the outer sleeve; and a feed device provided next to the at least one shaping drum;

wherein the at least one shaping drum is supported by a motor unit, wherein the at least one shaping drum projects from one side of the motor unit, wherein the outer sleeve comprises:

a belt structure; and a tread;

wherein the at least one shaping drum is coaxially aligned with the first-step building drum, wherein the at least one shaping drum comprises:

a rotation shaft; and two coaxial half-drums;

wherein the rotation shaft is connected for operation to the half-drums, wherein the half-drums are integral with each other with respect to rotation, wherein at least one of the half-drums is axially movable in both directions with respect to the other half-drum, wherein each half-drum comprises:

a support device;

a gripping device;

an elastic ring associated with the gripping device; and a centering device;

wherein the support device positions and applies a sidewall on the first-step sleeve, wherein the gripping device secures one axially opposed bead of the first-step sleeve on the half-drum, wherein the centering device positions one of the axially opposed beads on the half-drum, wherein a first equatorial plane defined by the centering devices is axially movable with respect to a second equatorial plane defined by the gripping devices, and wherein the elastic ring is configured to provide a fluid-tight seal, such that the outer sleeve is shaped into a toroidal configuration via an operating fluid.

16. The plant of claim 15, further comprising:

a pair of shaping drums;

wherein the pair of shaping drums are supported by the motor unit, wherein the pair of shaping drums project from opposite sides of the motor unit, and wherein the motor unit is mounted on a rotatable turret designed to change positioning of the pair of shaping drums with respect to each other.

* * * * *